Patented Mar. 7, 1933

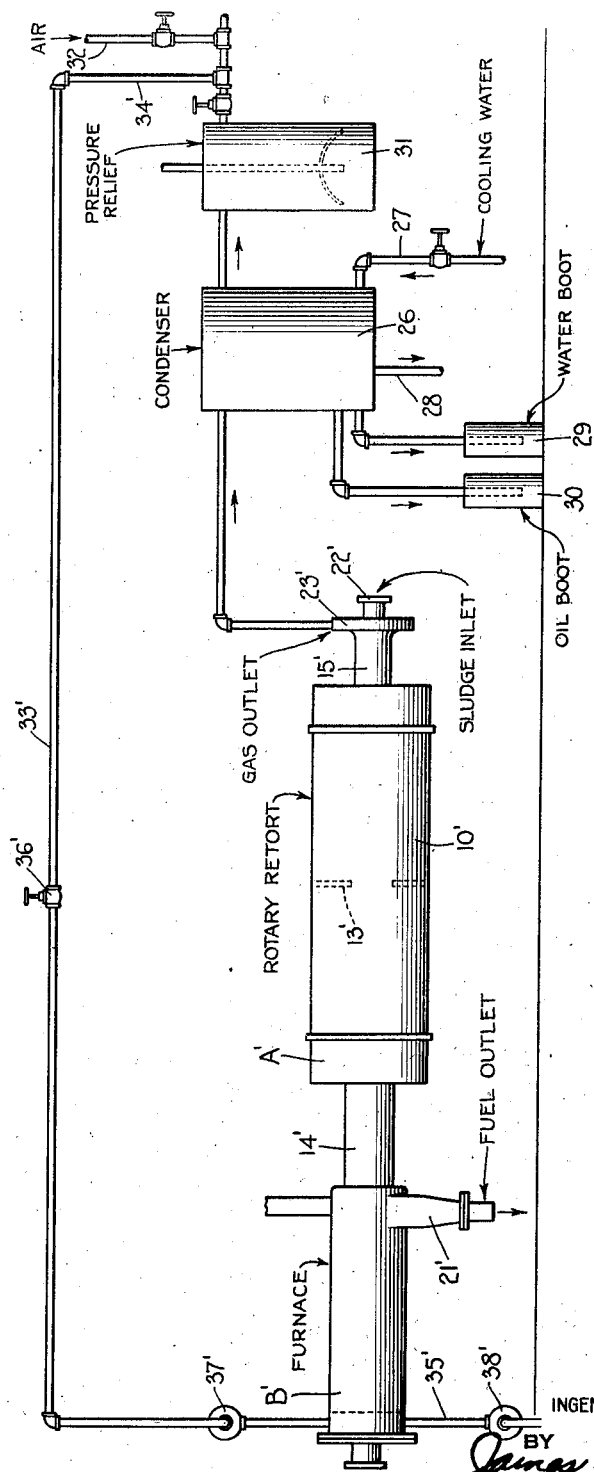

1,900,239

UNITED STATES PATENT OFFICE

INGENUIN HECHENBLEIKNER, OF CHARLOTTE, NORTH CAROLINA, ASSIGNOR TO CHEMICAL CONSTRUCTION CORPORATION, OF CHARLOTTE, NORTH CAROLINA, A CORPORATION OF DELAWARE

PROCESS OF MANUFACTURING $SO_2$ GAS

Application filed January 27, 1932. Serial No. 589,099.

This invention relates to a method of treating acid sludge obtained in the refining of petroleum, tar and other organic materials, and relates more particularly to an improved method for producing sulphurous acid gas and an acid-free fuel from acid sludge; and has special reference to the provision of improvements in the process of treating acid sludge set forth in my copending application Serial No. 568,050, filed Oct. 10, 1931.

In the process set forth in my said copending application, acid sludge is subjected in a retort to the action of hot combustion gases so that the organic matter of the sludge is made to react upon the sulphuric acid or its compounds in the sludge to convert the same to $SO_2$ gas which is removed from the sphere of reaction. The combustion gases are generated in a furnace; and the acid sludge in the retort is preferably directly heated with these combustion gases. By the reaction in the retort, the sulphuric acid and its compounds in the sludge are reduced to an $SO_2$ gas substantially free of impurities, which is produced in such a condition that it may be readily and efficiently converted in contact or catalytic apparatus to sulphuric anhydride and sulphuric acid. In addition to the obtaining of the $SO_2$ product there results the production of a granular sludge residue in the form of a very desirable fuel of an acid-free character having a high volatile content.

The combustion gases employed in the process and generated in the furnace may be obtained from a variety of sources and may be produced, for example, from the burning of natural gas, oil, powdered coal, coke, or other heat producing materials. Preferably the free oxygen content in the reaction atmosphere of the acid sludge retort should be below 10% by volume and preferably between 2 to 6%; and this is obtained by controlling the oxygen content or proportion in the combustion gases. However, in order to operate a large furnace with a low oxygen content using natural gas, oil, pulverized carbonaceous residue or pulverized coal, such high temperatures are developed in the furnace that it is difficult to maintain furnace linings without the use of expensive cooling such as water wall construction, and furthermore there is more than a little danger of undesirably overheating the acid sludge as it moves through the retort or converter.

I have empirically found that if part of the $SO_2$ gas generated in the retort, particularly after being cooled and scrubbed, be re-circulated in the system with the hot combustion gases, as by being introduced in and admixed with the fuel of the furnace, all danger of burning out furnace linings is effectively obviated, and that furthermore the possibility of overheating the sludge is effectively minimized. The recirculation of part of the generated $SO_2$ gas results in other important advantages in the process. Oil vapors remaining in the gases are consumed in the furnace, providing not only effective heat, but making it unnecessary to remove the same in scrubbing and drying towers. The controlled introduction of this $SO_2$ gas into the furnace places at the command of the operator a further direct control of the temperatures in the furnace and acid sludge retort, and a control of the strength of gas to be produced, so that the operator may compensate for variations in the acid content of sludges such as are bound to occur in the operation of a plant used in connection with a refinery. There also results a combustion gas low in carbon and thus more suitable for use in decomposing acid sludge. The prime object of the present invention therefore resides in the provision of the improved process of treating acid sludge whereby $SO_2$ gas is generated, and wherein a part of the generated $SO_2$ gas is thus re-circulated in the system for accomplishing these results.

To the accomplishment of these objects and other objects as will appear hereinafter, the present invention consists in the processes and the steps of the processes hereinafter more particularly described and sought to be defined in the claims, reference being had to the accompanying drawing, which shows a front elevational view of the apparatus which may be used in the practice of the process.

As set forth in my said copending application Serial No. 568,050, the process steps of the present invention may be suitably practiced in a retort apparatus such as shown in the drawing, wherein a body of petroleum or acid sludge is directly heated by hot combustion gases in an elongated drum-shaped retort $A'$, the combustion gases generated in a furnace $B'$ being introduced under suitable pressure into the drum retort $A'$.

The retort $A'$ preferably comprises a cylinder or drum generally designated as $10'$ made of iron or steel which if desired may be outwardly covered with a heat insulating medium. The drum $10'$ is preferably interiorly subdivided by means of one or more annular members such as $13'$ into a plurality of separate and intercommunicating compartments, two of which are exemplified in the drawing. The drum retort $10'$ is provided at its opposite ends with reduced cylinder sections $14'$ and $15'$ respectively which serve for the ingress and egress of the reacting constituents and resulting products.

In the preferred practice of the process, the sludge charge in the retort $10'$ is caused to flow through the compartments thereof and is thoroughly and continuously agitated as it moves through the compartments so that all parts of the charge are progressively reacted and acted upon during the processing. To accomplish these ends, the drum retort is preferably mounted for rotation during operation. Desirably, the sludge charge is more thoroughly agitated or kneaded by providing flights interiorly of the compartments (which elevate and drop the sludge mass during retort rotation) and by introducing iron rods or rails in the compartments which are in turn elevated by the flights and which drop onto the sludge body, acting to break up and pound the sludge and carbonaceous residue as these are caused to flow through the compartments and serving to prevent the same from caking, adhering to and building up on the walls of the retort and to facilitate the thorough and uniform treatment of the sludge body.

The cylindrical end section $14'$ of the retort $A'$ is made to serve as the intake or entrant end for combustion gases generated in the furnace $B'$ and the expulsion end for the carbonaceous residue produced, while the opposite cylindrical end section $15'$ of the retort is made to serve as the intake or entrant point for the feed sludge and as the exit or expulsion end for the $SO_2$ gas generated in the retort. Accordingly the end section $14'$ is made to receive and communicate with the usual nozzle of the combustion apparatus or furnace $B'$ and is made to communicate with a hopper $21'$ forming part of the furnace structure for the discharge of the carbonaceous residue, which hopper is sealed at the bottom by means of a slide door or the like. The end section $15'$ is in turn made to receive the sludge pipe $22'$ and is made to communicate with the gas outlet $23'$. Since the retort chamber $10'$ is rotatable, the joints between the retort $A'$ and the combustion furnace $B'$ at one end, and those between the retort and the gas outlet $23'$ at the other end, may be suitably packed with some stuffing material such as asbestos or the like. It will be understood that it is highly desirable to make these joints air-tight so as to prevent the ingress or atmospheric air into the retort at either end or the loss of gases from the retort.

In the operation of the system thus far described, a relatively weak feed sludge is introduced into the retort $A'$ through the pipe $22'$ and into the body of sludge in the retort under treatment, which sludge body is thoroughly agitated as it is rotationally moved with the retort and as the sludge body progressively flows through the rotary compartments to the residue discharge end $14'$ of the retort. Hot combustion gases generated in the furnace $B'$ are introduced into the retort through the end section $14'$ thereof and are caused to flow in the direction opposite to the direction of movement of the sludge body. In the operation of the system, the combustion gas flow and the flow of the feed sludge are controlled so as to create a number of reaction zones in the retort $A'$, all as set forth with greater particularity in my aforesaid copending application Serial No. 568,050. One or more of these zones is or are maintained at a temperature range for reacting the sludge to reduce the $H_2SO_4$ content or compounds thereof to $SO_2$, which latter is withdrawn from the retort at the gas outlet $23'$. In another reaction zone there takes place the final breaking up of the carbonaceous residue with further applied heating, which residue is reduced to a granular acid-free fuel having a high volatile content and which is withdrawn from the system at the fuel outlet hopper $21'$.

In the further operation of the process, the $SO_2$ gas generated in the retort $A'$ and exiting at the gas outlet $23'$ is led through a condenser 26 which may be cooled by water entering through a pipe 27 and passing out through a pipe 28. In this condenser a substantial quantity of water and a small amount of oil present in the generated $SO_2$ gas are condensed; and these separating into stratified layers are readily withdrawn into the water and oil boots 29 and 30. Here also may be removed any small traces of $SO_3$ if any are formed in the retort. The condenser also serves to cool the $SO_2$ gas to a low temperature which is substantially atmospheric temperature, and which more specifically is about 100° F. If desired, in order to prevent an undue rise in the pressure in the plant or system, a pressure relief valve such as 31 may be employed following the condenser 26.

As aforesaid, the combustion gases employed may be obtained from a variety of sources and may be produced, for example, from the burning of natural gas, oil, powdered coal, coke or other heat producing materials; and preferably the generated combustion gases should contain a low oxygen content desirably below 10% by volume and preferably between 2 to 6%. I have found that the control of the oxygen content in the combustion gases and in the reaction atmosphere of the retort is important in producing a number of advantageous results in the process. The presence of free oxygen is, I believe, a factor in inhibiting the formation of $H_2S$ gas in the retort when it is operated at the desired temperature range and is also a factor in effecting complete combustion of the gases; and the maintenance of the low proportion of free oxygen is, I believe, a factor in giving rise to a reaction atmosphere in the retort wherein the desired reduction and conversion of the sulphur containing compounds to $SO_2$ is effected. Also with a low oxygen content danger of fires is obviated and oxidation of the hydrocarbons in the acid sludge is minimized. The restriction of the free oxygen content in the retort is, I believe, also a factor in avoiding conversion of $SO_2$ to $SO_3$ in the retort. The oxygen content of the $SO_2$ gas leaving the condenser 26 being insufficient for subsequent conversion (where the $SO_2$ gas is subsequently converted to sulphuric anhydride and sulphuric acid), oxygen or air is introduced at 32 into the gas line and admixed with the produced $SO_2$ gas. As set forth in my copending application Serial No. 575,549, to contact method of sulphuric acid manufacture, filed Nov. 17, 1931, the air and $SO_2$ at this point of the system are so admixed as to obtain a ratio of oxygen to $SO_2$ entering the converter of the order of 1.4 to 1.

When operating the furnace with a low oxygen content using any of the fuels aforementioned, the temperatures developed in the furnace are so high as to render it difficult to maintain furnace linings without the use of expensive cooling equipment. Furthermore, as aforementioned, there is more than a little danger of undesirably overheating the acid sludge as it moves through the retort or converter. To obviate the danger of burning out furnace linings and to minimize the possibility of overheating the sludge, a part of the $SO_2$ gas generated in the retort is, according to the principles of the present invention, re-circulated in the system with the hot combustion gases. The re-circulated $SO_2$ gas is preferably taken or withdrawn from a stage of the system where the gases have already been cooled and scrubbed, and thus preferably from a point posterior to the condenser 26 and desirably anterior to the addition to the gases of the air used for conversion. The $SO_2$ gas is re-introduced into the system, preferably by being admixed with the fuel and more specifically with the air used in the furnace. To accomplish these results, I provide a return gas line 33' connected at one end to the pipe 34' at a point therein in advance of the air inlet 32 and connected at the other end to the furnace B' at the air intake end thereof. The said gas line 33' is controlled in any suitable manner, as by a valve 36', and is provided with a gas re-circulating blower 37'. The air inlet 35' of the furnace may be provided with a separate blower 38'. The amount of gas returned is regulated so as to produce a temperature of about 2000° F. for the combustion gases leaving the furnace B'. The control is such that the reaction gases leaving the gas outlet of the rotary retort A' have temperatures of from 240° to 260° F.

By thus re-circulating part of the cooled $SO_2$ gas with the hot combustion gases, and more particularly by thus admixing the cooled $SO_2$ gas with the fuel in the furnace, the furnace temperatures may be reduced and controlled. The temperatures in the furnace and the retort are thereby controlled to maintain the integrity of the furnace linings and to maintain the desired conditions in the retort. A strong $SO_2$ gas is produced in the retort due to using $SO_2$ gas as the diluent. Oil vapors remaining in the $SO_2$ gas which have not been removed by the condenser are consumed in the furnace, providing not only effective heat but making it unnecessary to use additional scrubbing equipment to remove such oil vapors. Moreover, the controlled introduction of the $SO_2$ gas into the furnace places at the command of the operator a further direct control of the temperatures in addition to that provided by controlling the gas and sludge feed flows, as well as a control of the strength of gas to be produced, so that the operator may compensate for variations in the acid content of sludges such as are bound to occur in the operation of a plant used in connection with a refinery. The use of the $SO_2$ as a diluent also results in a combustion gas product low in carbon and thus more suitable for use in decomposing the acid sludge.

The practice of my improved process, the operation of the plant and the advantages incident thereto and resulting therefrom will in the main be fully apparent from the above detailed description thereof. It will be fur-

I claim:

1. The method of treating acid sludge which consists in subjecting acid sludge to hot combustion gases whereby $SO_2$ gas is generated in re-circulating part of the generated $SO_2$ gas with the hot combustion gases.

2. The method of treating acid sludge which consists in subjecting acid sludge to hot combustion gases whereby $SO_2$ gas is generated, in cooling the generated $SO_2$ gas and in re-circulating part of the cooled $SO_2$ gas with the hot combustion gases.

3. The method of treating acid sludge which consists in subjecting acid sludge to hot combustion gases whereby $SO_2$ gas is generated, in scrubbing and cooling the generated $SO_2$ gas and in admixing part of the thus treated $SO_2$ gas with the hot combustion gases.

4. The method of treating acid sludge which consists in burning a fuel to produce hot combustion gases, in subjecting acid sludge to the hot combustion gases whereby $SO_2$ gas is generated and in admixing part of the generated $SO_2$ gas for the fuel.

5. The method of treating acid sludge which consists in burning a fuel to produce hot combustion gases, in subjecting acid sludge to the hot combustion gases whereby $SO_2$ gas is generated, in cooling the generated $SO_2$ gas and in admixing part of the cooled $SO_2$ gas with the fuel.

6. The method of treating acid sludge which consists in burning a fuel to produce hot combustion gases, in subjecting acid sludge to the hot combustion gases whereby $SO_2$ gas is generated, in cooling and scrubbing the generated $SO_2$ gas, and in re-circulating a part of the $SO_2$ gas by admixing the same with the air used with the fuel.

7. The method of recovering or producing sulphur dioxide from acid sludge which consists in agitating a body of the sludge, in subjecting the same directly to hot combustion gases to effect a reaction of the sludge body with a consequent reduction of the sulphuric acid content or compounds thereof to sulphur dioxide gas, in removing the sulphur dioxide gas from the sphere of reaction, and in re-circulating a part of the sulphur dioxide gas with the combustion gases.

8. The method of recovering $SO_2$ and carbonaceous contents from sludge which consists in heating the sludge with combustion gases and in carrying on the heat treatment in graduated temperature zones, at least one of the zones being maintained at a temperature range for reacting the sludge to reduce the $H_2SO_4$ content or compounds thereof to $SO_2$ and another zone being maintained at a temperature range for the final conditioning to a useful fuel of the carbonaceous content of the sludge, and in re-circulating a part of the $SO_2$ with the combustion gases.

9. The method of treating acid sludge which consists in subjecting the sludge directly to the treatment of combustion gases to reduce the $H_2SO_4$ content or compounds thereof to $SO_2$, in carrying on the treatment by flowing the combustion gases and the sludge into contact with each other in generally countercurrent directions, and in re-circulating a part of the produced $SO_2$ with the combustion gases.

10. The method of recovering $SO_2$ from acid sludge which consists in flowing heated gases over an agitated body of the sludge in an elongated retort, the heated gases being introduced at one end of the retort, in flowing feed sludge into the sludge body at the other end of the retort, in removing the solid residue of the sludge at the said one end of the retort, in withdrawing the generated $SO_2$ from said other end of the retort, in cooling the generated $SO_2$, and in re-circulating a part of the cooled $SO_2$ with the heated gases.

11. The method of treating said acid sludge which consists in subjecting acid sludge to the action of heated gases whereby $SO_2$ gas is generated and in re-circulating part of the generated $SO_2$ gas with the heated gases.

12. The method of treating acid sludge which consists in subjecting acid sludge to hot combustion gases whereby a moisture containing $SO_2$ gas is generated, in flowing the generated $SO_2$ gas through a condenser where moisture is condensed and the generated gas is cooled to a low temperature, and in re-circulating a part of the thus treated $SO_2$ gas with said hot combustion gases.

13. The method of treating acid sludge which consists in burning a fuel to produce hot combustion gases, in subjecting acid sludge directly to the hot combustion gases whereby a moisture containing $SO_2$ gas is generated, in flowing the generated $SO_2$ gas through a condenser where moisture is condensed and the generated gas is cooled to atmospheric temperature, and in admixing a part of the thus treated $SO_2$ gas with said fuel.

14. The method of generating $SO_2$ gas which consists in subjecting acid sludge to hot combustion gases in a gas atmosphere low in free oxygen whereby $SO_2$ gas low in free oxygen is generated, the oxygen content of the gas atmosphere being maintained below 10%, and in re-circulating part of the generated $SO_2$ gas with the hot combustion gases.

15. The method of generating $SO_2$ gas which consists in burning a fuel in the presence of air to produce hot combustion gases, the oxygen content of the combustion gases being maintained below 10%, in subjecting acid sludge to the hot combustion gases whereby $SO_2$ gas is generated, and in admixing part of the generated $SO_2$ gas with the air used with the fuel.

Signed at Charlotte, in the county of Mecklenburg and State of North Carolina this 8th day of January A. D. 1932.

INGENUIN HECHENBLEIKNER.